United States Patent [19]

Bateman

[11] Patent Number: 4,857,923
[45] Date of Patent: Aug. 15, 1989

[54] GROUND PROXIMITY WARNING SYSTEM FOR AN EXCESSIVE DESCENT RATE OVER UNDULATING TERRAIN

[75] Inventor: Charles D. Bateman, Bellevue, Wash.

[73] Assignee: Sundstrand Data Control, Inc., Redmond, Wash.

[21] Appl. No.: 886,201

[22] Filed: Jul. 15, 1986

[51] Int. Cl.⁴ .............................................. G08B 23/00
[52] U.S. Cl. .................... 340/970; 73/178 T; 342/65; 364/433
[58] Field of Search ........................ 340/963, 964, 970; 73/178 R, 178 T; 364/427, 428, 433, 434, 424; 342/65; 244/180

[56] References Cited

U.S. PATENT DOCUMENTS

| | | | |
|---|---|---|---|
| 3,925,751 | 12/1975 | Bateman et al. | 340/967 |
| 3,947,808 | 3/1976 | Bateman | 340/970 |
| 3,958,219 | 5/1976 | Bateman et al. | 340/970 |
| 4,030,065 | 6/1977 | Bateman | 340/970 |
| 4,060,793 | 11/1977 | Bateman | 340/970 |
| 4,121,287 | 10/1978 | Leal et al. | 340/970 |
| 4,215,334 | 7/1980 | Bateman | 340/970 |
| 4,551,723 | 11/1985 | Paterson | 340/970 |
| 4,567,483 | 1/1986 | Bateman et al. | 340/970 |

*Primary Examiner*—Joseph A. Orsino
*Assistant Examiner*—Brent A. Swarthout
*Attorney, Agent, or Firm*—Mason, Kolehmainen, Rathburn & Wyss

[57] ABSTRACT

An aircraft ground proximity warning system having an excessive descent rate warning mode which generates a warning signal when the descent rate of the aircraft exceeds a predetermined limit for the particular altitude of the aircraft above ground. The warning system provides for three separate warnings. A SINK RATE advisory warning is generated for combinations of lesser descent rates and greater altitudes. A PULL UP warning is generated for higher descent rates at lower radio altitudes. After a predetermined time after the SINK RATE warning is generated a TERRAIN warning is provided to indicate to the pilot of the aircraft that an excessive sink rate condition exists and the aircraft is flying over undulating or mountainous terrain. Also disclosed is logic circuitry for detecting that the aircraft is flying over undulating terrain.

14 Claims, 1 Drawing Sheet

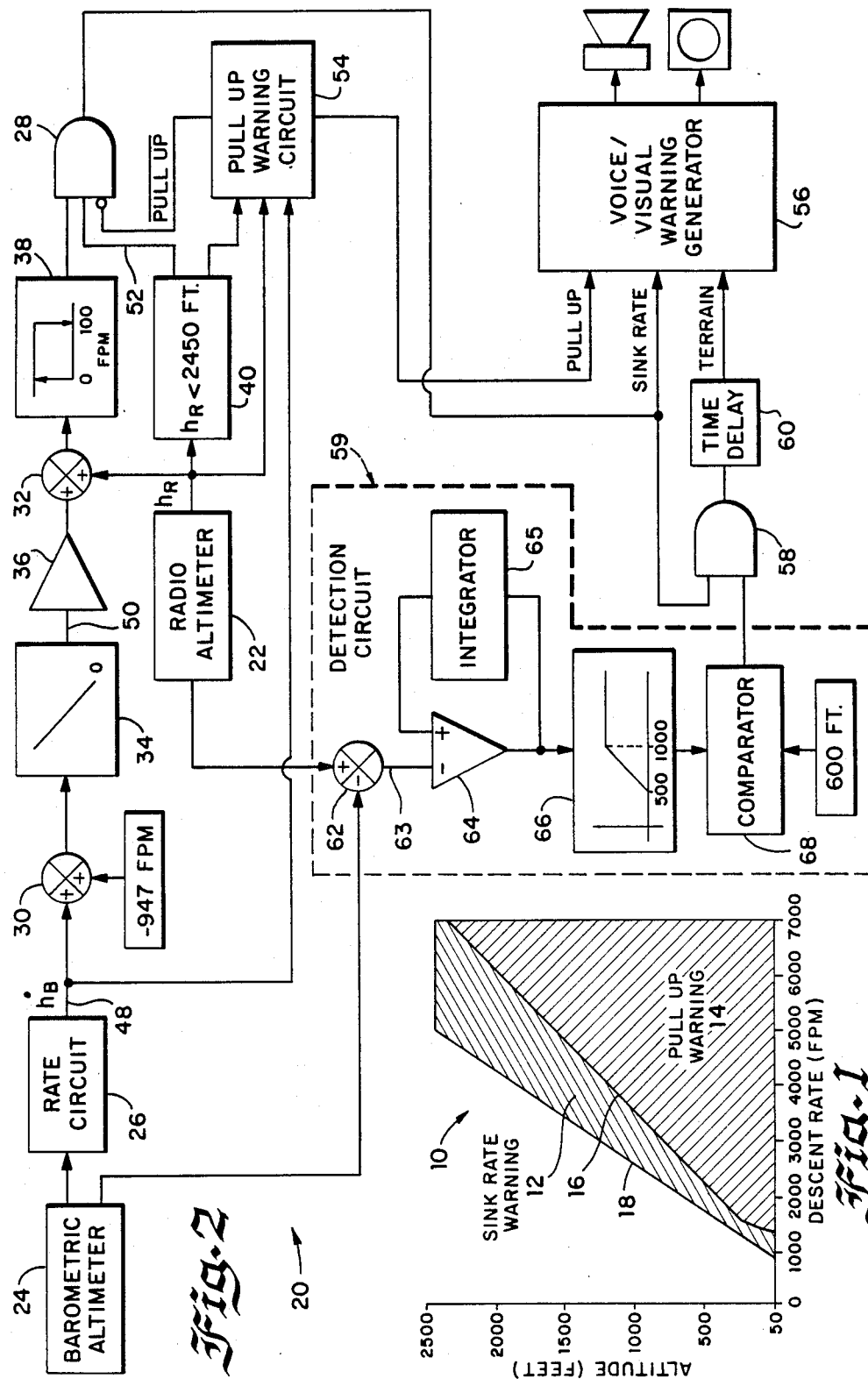

4,857,923

GROUND PROXIMITY WARNING SYSTEM FOR AN EXCESSIVE DESCENT RATE OVER UNDULATING TERRAIN

CROSS REFERENCE

This application is related to an application for a Ground Proximity Warning System Terrain Classification System by Bateman Ser. No. 06/886,198 filed on July 16, 1986, and assigned to the same assignee as the present invention.

BACKGROUND OF THE INVENTION

1. Field of the Invention

This invention relates generally to ground proximity warning systems, and more particularly, to a ground proximity warning system for aircraft of the type that provides warnings for an excessive descent rate of an aircraft for a particular altitude above ground at which the aircraft is flying. An advisory is also provided when an excessive descent rate condition exists and the aircraft is flying over mountainous or undulating terrain.

2. Description of the Prior Art

Ground proximity warning systems, including ground proximity warning systems that provide warnings when the descent rate of an aircraft is excessive for the particular altitude above ground at which the aircraft is flying are known. Typical systems that provide a warning when the descent rate is excessive are disclosed in U.S. Pat. Nos. 3,947,808; 4,060,793; and 4,215,334. All of the above-mentioned patents are assigned to the same assignee as the assignee of the present invention, and are incorporated herein by reference.

While the warning systems described in the above-mentioned references do provide satisfactory performance in most situations, there are some situations that require consideration. For example, in some situations, the aircraft may be intentionally placed into a rapid descent condition to avoid a missed approach. This situation typically occurs when an aircraft is on approach and is at too high of an altitude above ground for the distance at which the aircraft is from the airport. Thus, the pilot may try to avoid missing the approach by descending at a descent angle which would cause an excessive rate warning. Maneuvering in this manner to avoid a missed approach may be safe if the pilot is on a visual approach and can see the runway, or if the pilot is on an instrument approach, and the descent angle is not too steep and sufficient terrain clearance exists. Such a maneuver may cause a SINK RATE warning to be generated even though the maneuver is safe.

However, certain other factors must also be considered, for instance, a navigational error or pilot error. When an aircraft is intentionally placed into a condition of excessive descent rate by the pilot to avoid missing an approach, the pilot will be cognizant of this fact and will ignore Sink Rate warning. This is not a problem if the aircraft is on the correct approach, but if due to navigational or pilot error the aircraft is off course, ignoring the warning may result in impact with terrain before the pilot has a chance to react. Thus there exists a need to provide a warning system which provides satisfactory warning to the pilot in such a situation, particularly when the aircraft is flying over undulating terrain.

SUMMARY OF THE INVENTION

Accordingly it is an object of the present invention to provide a ground proximity warning system that overcomes the disadvantages of the prior art warning systems.

It is another object of the present invention to provide a ground proximity warning system to increase the warning time during an excessive descent rate condition that occurs while an aircraft is flying over mountainous or undulating terrain.

It is yet another object of the present invention to provide a warning that compensates for pilot error or navigational error on a missed approach phase of flight.

Therefore, in accordance with the preferred embodiment of the invention, there is provided a ground proximity warning system that provides a warning when an aircraft is experiencing an excessive descent rate for the altitude above ground at which the aircraft is flying during a phase of flight when the aircraft is flying over mountainous or undulating terrain. Three separate warnings are provided; SINK RATE, TERRAIN and PULL-UP. SINK RATE and PULL-UP warnings are provided whether the aircraft is experiencing an excessive descent rate condition irrespective of whether the aircraft is flying over undulating terrain. A unique TERRAIN warning is provided which provides an indication to the pilot that the aircraft is experiencing an excessive descent rate over undulating terrain. This warning is provided after a predetermined time after the SINK RATE warning is indicated. Thus, if the pilot intentionally puts the aircraft into an excessive descent rate and the aircraft is accidently flying over mountainous terrain, he will be apprised of the fact and be less likely to ignore the warning. The system is provided with circuitry that detects when the aircraft is flying over mountainous terrain to cause the TERRAIN warning to be generated following the SINK RATE advisory in the vent of an excessive descent rate into terrain.

DESCRIPTION OF THE DRAWING

These and other objects and advantages of the present invention will become readily apparent upon consideration of the following detailed description of the attached drawing wherein:

FIG. 1 is a graphical illustration of the warning envelope for an excessive descent rate condition; and FIG. 2 is a functional block diagram of the ground proximity warning system according to the invention.

DETAILED DESCRIPTION OF THE PREFERRED EMBODIMENT

Referring now to the drawing with particular attention to FIG. 1 there is shown a graphical illustration of the excessive descent rate warning envelope generally designated by the reference numeral 10. The warning envelope is comprised of two portions which relate to the SINK RATE alert portion 12 and the PULL UP warning portion 14. The SINK RATE portion is shown cross-hatched between lines 16 and 18. The PULL UP warning portion 14 of the envelope is shown below line 16. The SINK RATE portion 12 of the excessive descent rate warning envelope is used to provide the pilot of an aircraft with an alert prior to the aircraft attaining a condition where evasive action is dictated such as where the condition would fall within the PULL UP portion 14 of the warning envelope 10. As can be seen from FIG. 1, the SINK RATE portion 12 of the warning envelope 10 generally corresponds to relatively lower descent rates at relatively higher radio altitude than the PULL UP portion 14.

In certain situations the pilot of an aircraft may ignore the SINK RATE warning because it is intended to be an advisory warning, particularly if the pilot is intentionally flying the aircraft at a high descent rate. Such situations arise, for example, when the pilot intentionally puts the aircraft into an excessive SINK RATE condition to avoid a missed approach. Since the pilot intentionally placed the aircraft into an excessive descent rate condition, the pilot may choose to ignore the SINK RATE warning or alert. If due to a navigational error the aircraft is flying over mountainous or undulating terrain when the pilot chooses to ignore the sink-rate alert, this may give rise to a condition where the pilot would have insufficient time to react before impact into mountainous terrain. The invention described herein solves this problem by detecting when an aircraft is flying over mountainous terrain and provides a TERRAIN warning when the aircraft is experiencing this condition.

Referring to FIG. 2, there is illustrated a ground proximity warning system generally designated by the reference numeral 20 in accordance with the present invention. The system 20 according to the invention is illustrated in FIG. 2 in functional or logic block diagram form as a series of gates, comparators and the like for purposes of illustration; however, it should be understood that the actual implementation of the logic can be other than that as shown in FIG. 2, with various digital and analog implementations being possible. The signals used by the warning system as described include signals representative of the radio altitude and the barometric altitude and rate of Z-velocity or vertical velocity. Depending upon the type of aircraft in which the warning system is installed, the signals can be obtained from individual instruments, such as a radio altimeter 22, a barometric altimeter 24 (or air data computer) and a barometric altimeter rate circuit 26 (or from an inertial navigation system when Z-velocity is used), or from a digital data bus (not shown) in certain newer aircraft.

The warning system 20 according to the invention provides a warning when the aircraft is in a condition of excessive descent rate. Both a SINK RATE alert and a PULL UP warning are provided to indicate to the pilot of the aircraft an impending impact with the terrain. When the aircraft is flying over undulating or mountainous terrain, a TERRAIN warning is also provided.

The SINK RATE warning circuit is comprised of an AND gate 28, two summing junctions 30 and 32, a limiter 34, a scaling amplifier 36, and a pair of comparators 38 and 40. The SINK RATE warning circuit is responsive to signals from the barometric rate circuit 26 (or the Z-velocity signal) and the radio altimeter 22 and enables the voice/visual warning generator 56. A signal from the barometric altimeter 24 is provided to a rate circuit 26. The rate circuit 26 provides a signal $\dot{H}_b$ over a line 48 to the positive junction of a summing junction 30. The $\dot{H}_b$ signal is biased by a signal representing a descent rate of 947 feet per minute. The resulting output from the summing junction 30 is applied to a limiter 34. The limiter 34 functions to limit the magnitude of the biased $\dot{H}_b$ signal from the summing junction 30. The signal from the limiter 34 is applied over a line 50 to a scaling amplifier 36. The scaling amplifier 36 serves to scale the output of the limiter by the factor of K3. In the preferred embodiment the value of K3 is selected to be 0.6031 which corresponds to the slope of the SINK RATE warning boundary 12 of FIG. 1. The output of the scaling amplifier 36 is then applied to a positive junction of a summing junction 32 along with a signal representative of the radio altitude. Both signals are summed in the summing junction 32 and applied to a comparator 38. The comparator 38 will apply a positive logic signal to an AND gate 28 when the scaled output of the scaling amplifier 36 exceeds the signal representative of the radio altitude. A positive logic signal is then applied to the AND gate 28 along with a signal applied to the inverting input of the AND gate 28 from the PULL UP circuit 54 and the signal from a comparator 40. The PULL UP signal inhibits the SINK RATE alert during a PULL UP warning. The other signal applied to the AND gate 28 is from comparator 40 which will apply a positive logic signal overline 52 to enable the SINK RATE warning only when the radio altitude is less than 2450 feet.

The PULL UP warning circuit is shown functionally in a block identified by reference numeral 54. The PULL UP warning circuit receives a signal from the barometric altitude rate circuit 26, the radio altitude and comparator 40 to provide that portion of the warning envelope identified as portion 14 in FIG. 1. The PULL UP warning circuit is described in detail in U.S. Pat. No. 4,060,793, which is hereby incorporated by reference. The PULL UP warning circuit 54 also provides a PULL UP signal to the voice visual warning generator 56.

The voice visual warning generator 56 is coupled to a transducer, such as a loudspeaker or earphones and to a visual display in the aircraft cockpit. Thus when a positive logic signal is applied to the voice visual warning generator, such as a PULL UP or a SINK RATE initiating signal, a visual or aural alert is provided. The voice/visual warning generator is described in detail in U.S. Pats. No. 3,925,751 and 4.030,065, which are also incorporated by reference.

In accordance with an important feature of the present invention, the voice/visual warning generator 56 is also designed to provide another unique warning such as a TERRAIN warning, which is indicative that the aircraft is experiencing an excessive descent rate condition while flying over mountainous or undulating terrain. This signal is under the control of an AND gate 58, which after a time delay provided by a timing circuit 60, provides a signal to the voice/visual warning generator 56 and thus enables the TERRAIN warning signal.

The AND gate 58 receives two inputs. One of the inputs is a SINK RATE enabling input which is applied to the AND gate 58 when the AND gate 28 is enabled. The other input to the AND gate 58 is from a detection circuit shown within a dashed block, identified by the numeral 59, which is comprised of a summer 62, an amplifier 64, an integrator 65, a function generator 66 and a comparator 68.

The circuitry for detecting whether the aircraft is flying over mountainous terrain is responsive to signals representative of the barometric altitude of the aircraft and the radio altitude of the aircraft. In general, the circuitry 59 detects the topography of the terrain over which the aircraft is flying. This is accomplished by taking the difference between radio altitude and barometric altitude of the aircraft. At any particular time, the difference between the barometric altitude and the radio altitude of an aircraft will be equivalent to the barometric altitude of the terrain at the point being overflown by the aircraft at that particular time. While an aircraft is flying over relatively flat terrain, the signal representative of the difference will be relatively constant. However, when the aircraft is flying over undulating terrain, the signal will vary with time as a function of the topography of the terrain and the speed of the aircraft. This signal will thus be indicative that the aircraft is flying over undulating terrain. The difference signal is integrated to provide a biasing signal which is a function of the difference.

A signal representative of the radio altitude is obtained from the radio altimeter 22 and applied to a positive input of summing junction 62. A signal representative of the barometric altitude obtained from a barometric altimeter 24 (or an air data computer, not shown) is applied to the negative input of the summing junction 62. The output of the summing junction 62 is applied to an inverting input of an amplifier 64.

An integrator 65 is connected to the output of the amplifier 64 whose output is applied to a non inverting input of the amplifier 64 thus forming a closed feedback loop. The integrator functions to provide a biasing signal which is a function of the difference of the signals representative of the radio altitude and the barometric altitude. The integrator constants are selected to cancel the signal applied to the inverting input after a predetermined time. After the predetermined time the output signal from the amplifier 64 will be washed out. In other words, after the predetermined time period, there will be no signal at the output of amplifier 64. In the preferred embodiment, it is also desirable to inhibit the biasing circuitry under the following conditions: failure of either the barometric or radio altimeter, or radio altitude of the aircraft being greater than a predetermined amount, e.g., 5000 feet.

The output of the amplifier 64 is applied to a function generator 66. The function generator 66 supplies a signal based upon the amplifier 64 output and is scaled to provide a signal representative of between 500 and 1000 feet of altitude. This signal is applied to a comparator 68 along with a signal representative of 600 feet of altitude of above ground. If the output signal from the function generator is greater than 600 feet, then a positive logic signal will be applied to the AND gate 58 indicative that the aircraft is flying over undulating terrain. This will place the AND gate 58 under the control of the SINK RATE warning signal which has heretofore been described. If a SINK RATE warning signal is enabled and the aircraft is flying over undulating terrain a TERRAIN warning will be initiated after a time delay provided by a timing circuit 60.

In the preferred embodiment, a two minute time period for the integrator 65 is selected. Although other time periods will work, the two minute time period was selected to cover a distance which would span a plurality of points of inflection in the terrain. Typically, an aircraft which is flying at a normal cruising speed will travel approximately twelve nautical miles in that period. In many regions this distance will be sufficient to span a plurality of points of inflection in the terrain.

In such a system as heretofore described, the pilot is provided with an additional warning which informs the pilot that the aircraft is experiencing an excessive descent rate condition while the aircraft is flying over mountainous terrain. Thus, in a condition where a pilot intentionally puts the aircraft in a condition of excessive descent rate in order to avoid a missed approach condition wherein the pilot who may have disregarded a SINK RATE alert because of the fact he intentionally put the aircraft in an excessive descent rate condition, will be provided a TERRAIN alert to advise him that the aircraft is flying over mountainous terrain. The pilot after disregarding the SINK RATE alert would be provided a TERRAIN warning to enable him to take corrective action to avoid an impending terrain contact. Since this warning is provided one second after the SINK RATE alert and before a PULL-UP warning, the pilot is provided with additional time prior to the PULL-UP warning in which to take evasive action.

Obviously many modifications and variations of the present invention are possible in light of the above teachings. For example, even though the invention described herein is described in connection with excessive descent rate warning while flying over undulating terrain, the invention is adaptable to other type of aircraft warnings such as terrain closure, sink after take-off, etc. Thus, it is understood that within the scope of the appended claims, the invention may be practiced otherwise than as specifically designated above.

I claim:

1. A ground proximity warning system for an aircraft comprising:
   signal generating means for providing a warning signal representative of a dangerous flight condition;
   a first source of signals representative of the radio altitude of the aircraft;
   a second source of signals representative of the barometric altitude of the aircraft;
   detecting means for detecting whether the aircraft is flying over undulating terrain wherein said detecting means does not require signals representative of the longitude and latitude of the aircraft, responsive to said first source of signals and said second source of signals, including comparing means for comparing said radio altitude signals with said barometric altitude signals for developing a difference signal which varies with time as a function of the undulating terrain; whereby when the difference signal exceeds a predetermined limit an undulating terrain condition exists and
   biasing means responsive to said detecting means for biasing said warning signal when undulating terrain is detected.

2. A ground proximity warning system as recited in claim 1 wherein said detection means includes;
   means for integrating said difference signal for a predetermined time period to provide an integrated signal and comparing the integrated signal with said difference signal.

3. A ground proximity warning system as recited in claim 2 wherein said predetermined time period is substantially equal to two minutes.

4. A ground proximity warning system as recited in claim 1 wherein said dangerous flight condition relates to an excessive sink rate condition.

5. A ground proximity warning system for an aircraft comprising:
   a first source of signals representative of the radio altitude of the aircraft;
   a second source of signals representative of the barometric altitude of the aircraft;
   a sink rate warning means for generating a warning when the sink rate of the aircraft is greater than a predetermined value;

detecting means for detecting whether the aircraft is flying over undulating terrain wherein said detecting means does not require signals representative of the longitude or latitude of the aircraft responsive to said first source of signals and said second source of signals, including comparing means for comparing said radio altitude signals with said barometric altitude signals for developing a difference signal which varies with time as a function of the undulating terrain; whereby when the difference signal exceeds a predetermined limit an undulating terrain condition exists and terrain warning means responsive to said detecting means and said sink rate warning means for providing a terrain warning when the sink rate of the aircraft is greater than said predetermined value and said aircraft is flying over undulating terrain.

6. A ground proximity warning system as recited in claim 5 wherein said detecting means includes;
means for integrating said difference signal for a predetermined time period and comparing the integrated difference signal with said difference signal.

7. A ground proximity warning system as recited in claim 6 wherein said predetermined time period is substantially equal to two minutes.

8. A ground proximity warning system as recited in claim 5 further including means for delaying said terrain warning for a predetermined time after said sink rate warning is initiated.

9. A terrain topography detection circuit for use in an aircraft comprising:
means for receiving a source of signals representative of the altitude of the aircraft above ground;
means for receiving a source of signals representative of the barometric altitude of the aircraft; and
means responsive to said means for receiving a source of signals representative of the altitude of the aircraft above the ground and said means for receiving a source of signals representative of the barometric altitude of the aircraft for generating a signal representative of the terrain topography, wherein said means does not require signals representative of the longitude or latitude of the aircraft and includes comparing means for comparing said altitude above ground signals with said barometric altitude signals for developing a difference signal which varies as a function of undulating terrain whereby when the difference signal exceeds a predetermined limit an undulating terrain condition exists.

10. A terrain topography detection circuit as recited in claim 9 wherein said difference signal is integrated with respect to time for a predetermined time period.

11. A terrain topography detection circuit as recited in claim 10 wherein said predetermined time period is substantially equal to two minutes.

12. An excessive descent rate signal generating system for use in an aircraft comprising:
means for receiving a source of signals representative of the altitude of the aircraft above ground;
means for receiving a source of signals representative of an altitude of the aircraft above a datum;
signal generating means responsive to said means for receiving a source of signals representative of the altitude of the aircraft above ground and to said means for receiving a source of signals representative of the altitude of the aircraft above a datum for generating a signal representative of an excessive descent rate condition;
detecting means for providing a signal representing that the aircraft is flying over undulating terrain, wherein said detection means does not require signals representative of the longitude and latitude of the aircraft including means for comparing said altitude above ground signal with said altitude above a datum signal for developing a difference signal which varies with time as a function of undulating terrain whereby when the difference signal exceeds a predetermined limit an undulating terrain condition exists; and
means responsive to said signal generating means and said detection means for providing a signal representative of an excessive descent rate condition while the aircraft is flying over undulating terrain.

13. An excessive descent rate signal generating system as recited in claim 12 wherein said detecting means includes;
means for integrating said difference signal for a predetermined time period and comparing the integrated signal with said difference signal.

14. An excessive descent rate signal generating system as recited in claim 13 wherein said predetermined time period is substantially equal to two minutes.

* * * * *